3,224,993
TITANIUM DIOXIDE PIGMENT COATED
WITH POLYVINYL ALCOHOL
Reginald George Wynne, West Hartlepool, England, assignor to British Titan Products Company Limited, Durham, England, a company of Great Britain
No Drawing. Filed Mar. 26, 1962, Ser. No. 182,686
Claims priority, application Great Britain, Apr. 10, 1961, 12,877/61
16 Claims. (Cl. 260—29.6)

This invention relates to titanium dixoide pigments. Such pigments are widely used, e.g. in paint compositions and as fillers in paper.

The incorporation of titanium dioxide pigments into aqueous emulsion paints often results in flocculation of the pigment or of the medium. This may cause the viscosity of the paint to be too high, and may also cause the paint to thicken very quickly during storage. Moreover, the degree of flocculation may vary, so that different paint compositions containing the same ingredients in the same proportions may have different viscosities; varying amounts of additives must then be added to these different compositions in order that they should all have the same viscosity. The application to a surface of paint compositions in which flocculation has occurred often produces an unpleasant rough and uneven effect.

The object of this invention is to provide a titanium dioxide pigment with a reduced tendency to flocculate or to cause flocculation in compositions comprising it.

In accordance with the present invention, titanium dioxide pigment is treated with polyvinyl alcohol. The novel treated pigment is then found to satisfy the aforesaid object.

The treated titanium dioxide particles of the invention may be prepared by intimately mixing together titanium dioxide particles and polyvinyl alcohol. These two materials may both be mixed together in the form of solids; alternatively, the polyvinyl alcohol may be in solution or in suspension and/or the titanium dioxide may be in the form of an aqueous suspension. The resulting treated particles may be dried, if necessary, and/or milled.

The titanium dioxide pigment used in accordance with the present invention may be prepared in any manner. For example, it may be made from titaniferous ore by the so-called "sulphate process," or by the vapour-phase halogenation of the ore followed by vapour-phase oxidation of the halide thus formed. Such vapour-phase reactions may be carried out in a fluidised bed of inert particles.

The titanium dioxide particles may be anatase or rutile particles. If desired, they may receive preliminary coatings of known coating materials before the treatment with polyvinyl alcohol is applied. If the titanium dioxide particles are not coated with other materials before the polyvinyl alcohol is applied, it is preferable that they be washed before the polyvinyl alcohol is applied, so as to remove at least part of any soluble inorganic salts which may be present on their surface.

In one method of treatment, titanium dioxide particles and solid polyvinyl alcohol are milled together, for example in a micropulveriser, so as to produce an intimate mixture having the desired particle size.

As regards a wet method of treatment, the polyvinyl alcohol may be added, either as solid or in solution, to an aqueous suspension of titanium dioxide particles; the latter particles, so treated, may then be filtered off, dried and milled in the normal manner. If the dioxide is to receive a preliminary coating treatment with known coating materials, e.g. silica, alumina, and/or titanium dioxide, the wet treatment of the present invention may be performed by adding the polyvinyl alcohol to the conventional coating treatment tanks wherein is present the coated titanium dioxide already in suspension.

Pigments obtained by treating, with polyvinyl alcohol, titanium dioxide which has been only calcined and milled before such treatment, show improved properties when compared with untreated pigments, but it is preferred that the treatment with polyvinyl alcohol be applied to titanium dioxide after the latter has been subjected to additional steps, for example to hydroseparation in which the titanium dioxide is suspended in water and centrifuged under controlled conditions to remove larger particles.

Sufficient polyvinyl alcohol is suitably used in the present process to allow at least 0.1% and generally less than 5% of polyvinyl alcohol, by weight of the titanium dioxide pigment, to be retained on such pigment. It is often found that no further increase in the beneficial effects is noted when the amount of polyvinyl alcohol retained is increased beyond 2%. It is possible that the retention of more than 5% of polyvinyl alcohol on the pigment may sometimes lead to an adverse effect on the properties of the pigment. In general, the preferred amount of polyvinyl alcohol retained on the pigment is 0.2% to 1%, by weight of the titanium dioxide pigment and it is preferred to treat the titanium dioxide with sufficient polyvinyl alcohol to give this amount retained on the pigment.

The polyvinyl alcohol may be a commercial polyvinyl alcohol. Such commercial polyvinyl alcohol may contain polyvinyl acetate. It is preferred that the polyvinyl alcohol should not contain too large a proportion of polyvinyl acetate. Thus, a mixture of polyvinyl alcohol and polyvinyl acetate containing less than 20% by weight, of the acetate is more effective in the present invention than one containing 30% or more of the acetate. It is preferred that the amount of polyvinyl acetate be less than 15%, especially less than 5% by weight of the total polyvinyl alcohol and polyvinyl acetate.

The coated titanium dioxide particles of the invention are particularly suitable for incorporation into aqueous emulsion paints, such as those based on polyvinyl acetate, vinyl acetate copolymers, styrene or butadiene polymers, polymers formed from acrylic and substituted acrylic acid monomers and other polymers capable of providing film forming aqueous emulsions or solutions.

The following example illustrates the invention:

*Example*

A glass jar was charged with 130 parts by weight of 7–8 mm. glass balls (Ballotini), 55 parts by weight of water, 5 parts by weight of 5% sodium hexametaphosphate solution, and 100 parts by weight of rutile pigment which had not been treated with polyvinyl alcohol. The jar was sealed and the contents were ball milled overnight.

140 parts by weight of the resulting mill base was added to 150 parts by weight of polyvinyl acetate emulsion (Vandyke 1115). (The word "Vandyke" is a trademark.) The mixture was hand stirred for one half minute and vigorously shaken for one half minute and the resulting paint composition A was stored in a sealed container.

Four other paint compositions B, C, D and E were made up in the same way as A, except that the pigment had been previously milled in a micropulveriser with 0.2 part by weight of four commercially available polyvinyl alcohols. In the case of B, the polyvinyl alcohol contained 20% polyvinyl acetate, by weight of total polyvinyl alcohol and polyvinyl acetate; in the case of C, 15%; in the case of D, 10%; and in the case of E, 1.5%.

Each paint composition was examined after 24 hours storage in the following manner:

(a) A film of the paint composition was cast on a glass plate by means of a doctor blade and appropriate standard shims, so that the resulting wet film was five thousandths of an inch thick. The film was allowed to dry, and the superficial appearance of the dry film was compared with those of paint compositions prepared in a similar manner from standard pigments kept for this purpose.

(b) The viscosity of the paint composition was measured by a Ferranti portable viscometer, at a shear rate of 125 sec.$^{-1}$ after agitation at high shear rate for one minute.

The results obtained are given below.

| | Pigment | Appearance of Film | Viscosity (centipoises) |
|---|---|---|---|
| A | Rutile (untreated) | Good | 1,500 |
| B | Rutile (treated with 0.2% polyvinyl alcohol containing 20% polyvinyl acetate). | Good | 385 |
| C | Rutile (treated with 0.2% polyvinyl alcohol containing 15% polyvinyl acetate). | Excellent | 385 |
| D | Rutile (treated with 0.2% polyvinyl alcohol containing 10% polyvinyl acetate). | Excellent | 385 |
| E | Rutile (treated with 0.2% polyvinyl alcohol containing 1.5% polyvinyl acetate. | Even better than C or D. | 385 |

What I claim is:

1. A low viscosity, pigmented surface coating composition having reduced tendency to flocculate comprising an aqueous emulsion of at least one film-forming polymer selected from the group consisting of homopolymers and copolymers of vinyl acetate, styrene, butadiene, acrylic acid and substituted acrylic acid in which there is incorporated pigmentary titanium dioxide particles coated with a normally solid polyvinyl alcohol polymer.

2. Composition as defined in claim 1 wherein said particles are coated with at least about 0.1 percent by weight, based on the weight of said particles, of said polyvinyl alcohol polymer.

3. Composition as defined in claim 1 wherein said particles are coated with from about 0.1 to about 5 percent by weight of polyvinyl alcohol polymer.

4. Composition as defined in claim 1 wherein said particles are coated with from about 0.2 to about 1 percent by weight of polyvinyl alcohol polymer.

5. Composition as defined in claim 1 wherein said polyvinyl alcohol polymer contains not more than about 30 percent by weight vinyl acetate.

6. Composition as defined in claim 1 wherein said polyvinyl alcohol polymer contains not more than about 15 percent by weight vinyl acetate.

7. Composition as defined in claim 1 wherein said polyvinyl alcohol polymer contains not more than about 5 percent by weight vinyl acetate.

8. A process for preparing a pigmented aqueous emulsion surface coating composition having reduced tendency to floccultae and reduced viscosity comprising incorporating in an aqueous emulsion of a film-forming polymer pigmentary titanium dioxide particles coated with a normally solid polyvinyl alcohol polymer.

9. Process as defined in claim 8 wherein said surface coating composition is an aqueous emulsion of at least one film-forming polymer selected from the group consisting of homopolymers and copolymers of vinyl acetate, styrene, butadiene, acrylic acid and substituted acrylic acid.

10. Process as defined in claim 8 wherein said particles are coated with at least about 0.1 percent by weight, based on the weight of said particles, of said polyvinyl alcohol polymer.

11. Process as defined in claim 8 wherein said particles are coated with from about 0.1 to about 5 percent by weight of polyvinyl alcohol polymer.

12. Process as defined in claim 8 wherein said particles are coated with from about 0.2 to about 1 percent by weight of polyvinyl alcohol polymer.

13. Process as defined in claim 8 wherein said polyvinyl alcohol polymer contains not more than about 30 percent by weight vinyl acetate.

14. Process as defined in claim 8 wherein said polyvinyl alcohol polymer contains not more than about 15 percent by weight vinyl acetate.

15. Process as defined in claim 8 wherein said polyvinyl alcohol polymer contains not more than about 5 percent by weight vinyl acetate.

16. In an aqueous emulsion paint composition comprising an aqueous emulsion of a film-forming polymer, the improvement which comprises titanium dioxide particles coated with a normally solid polyvinyl alcohol polymer incorporated as a pigment in said paint composition.

References Cited by the Examiner
UNITED STATES PATENTS

| | | | |
|---|---|---|---|
| 2,338,580 | 1/1944 | Fordyce | 260—29.6 |
| 2,907,670 | 10/1959 | Katz et al. | 106—308 |
| 3,024,209 | 3/1962 | Ferrigno | 260—41 |
| 3,076,719 | 2/1963 | Whately et al. | 106—308 |

MURRAY TILLMAN, *Primary Examiner.*

MORRIS LIEBMAN, *Examiner.*